Figure 1:
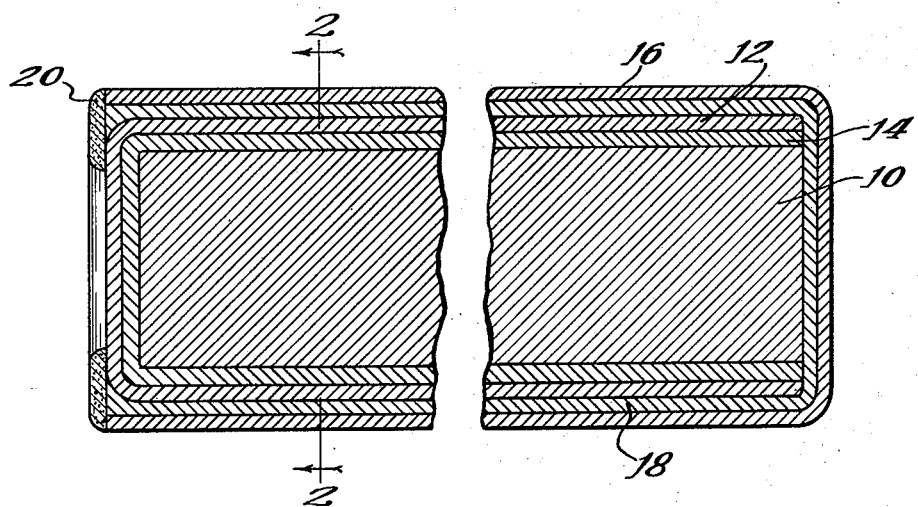

March 1, 1960 W. R. HUEY 2,927,071
JACKETED URANIUM NUCLEAR REACTOR FUEL ELEMENT
Filed March 4, 1947

INVENTOR.
William R. Huey
BY
Attorney

United States Patent Office 2,927,071
Patented Mar. 1, 1960

2,927,071

JACKETED URANIUM NUCLEAR REACTOR FUEL ELEMENT

William R. Huey, Swarthmore, Pa., assignor to the United States of America as represented by the United States Atomic Energy Commission Application March 4, 1947, Serial No. 732,277

1 Claim. (Cl. 204—193.2)

This case relates to a novel article of manufacture for use in neutronic reactors.

In neutronic reactors of any type, a neutron-fissionable isotope such as $U^{233}$, $U^{235}$, or $Pu^{239}$ is subjected to fission by neutron bombardment and a self-sustaining chain reaction is established by the neutrons evolved by the fission. The theory and operation of such reactors are described in the co-pending application of Enrico Fermi and Leo Szilard, Serial No. 568,904, filed December 19, 1944, now Patent No. 2,708,636.

In the operation of such reactors at high power, difficulty may be encountered due to elements of the reactor other than the fissionable material becoming contaminated with radioactive fragments of fissionable material. Therefore, such reactors now commonly have the fissionable materials covered by non-fissionable jackets which are sealed so that radioactive substances may not escape. When such jackets are employed, it becomes necessary, where high-temperature operation of the reactor is to be undertaken, to insure excellent heat transfer between the fissionable material, in which heat is generated, and the jacket in order that the heat may be carried off, both from the point of view of utilization of the heat and from the point of view of avoiding the development of excessively high temperatures within the fissionable material.

It has been found convenient to use the fissionable materials in the form of "slugs" which are commonly cylindrical in shape and of a length which renders their fabrication and use practical and convenient. Such slugs of fissionable material are commonly placed end-to-end in the reactor in channels provided for this purpose. The reactor is commonly provided with a liquid or gas coolant which is circulated past the jacketed slugs and carries off the heat generated in the fissionable material and transmitted to the jacket material. The jacket material is usually of high thermal conductivity and low neutron absorption, such as aluminum and is commonly bonded to the fissionable material by a bonding layer of a suitable thermally conductive material.

Such jackets must be completely pressure-tight in order to prevent leakage of the coolant into the jacket and consequent corrosion, and likewise to prevent leakage of radioactive materials from the interior of the jacket into the coolant. It has been found that ordinary pressure-tight containers cannot sufficiently accomplish this purpose because of the extremely adverse conditions of temperature to which such jackets, as above described, are exposed. Therefore, it is necessary to provide a jacket which constitutes an enclosure which is hermetic to an extent heretofore not known.

It is the principal object of this invention to provide a jacket for fissionable materials adapted to maintain a pressure-tight seal under the conditions occuring in a neutronic reactor as described above.

More specifically, it is an object of this invention to provide an assembly of a fissionable material within a protective jacket which minimizes the possibility of leakage between the exterior of the jacket and the fissionable material contained therein.

Figure 2:
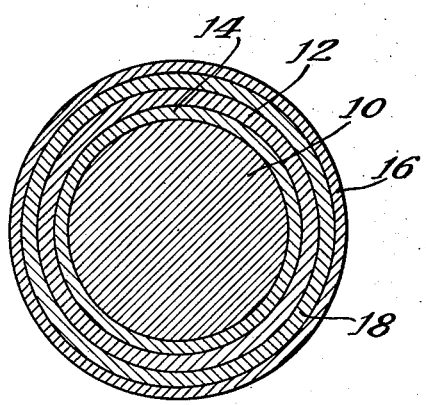

Generally speaking, the above objects of this invention are achieved by maximizing the length of the potential leakage path from the exterior of the jacket to the fissionable material. The possibility of the development of leakage has been found to be greatest through the seal or bond which effects closure of the jacket. The present invention prevents such leakage by providing a stucture in which leakage cannot be caused by development of slight defects in the seal or bond. For a more complete understanding of the invention, reference is made to the attached drawing in which:

Fig. 1 is a longitudinal sectional view of a jacketed member of fissionable material made in accordance with the teachings of this invention; and Fig. 2 is a transverse sectional view of the jacketed member of Fig. 1.

A cylindrical body 10 of fissionable material, for example uranium, is enclosed within a close-fitting cup-shaped jacket 12 of a material having high thermal conductivity and low neutron absorption, such as aluminum. The jacket 12 is bonded to the fissionable body 10 by a layer 14 of a bonding material such as an aluminum-silicon alloy. The materials and method of interposing such a bonding layer do not constitute any portion of this invention, being described in the co-pending application of Eugene Wigner, Leo Szilard and Edward Creutz, Serial No. 668,110, filed May 8, 1946, now Patent No. 2,872,401, issued February 3, 1959. The cup-shaped jacket 12 has fitted thereover, and inverted with respect thereto, a similar cup-shaped jacket 16 of slightly larger diameter, the outer jacket 16 being bonded to the inner jacket 12 by a second layer of bonding material 18 which likewise bonds the face of the fissionable body 10 at the open end of the inner jacket 12 to the outer jacket 16.

It will be readily seen that in order for a leakage path to develop through the bonding material between the fissionable body 10 and the exterior, it is necessary that the bond 18 become defective along the entire length of the unit. As illustrated in the drawing, there is added over the open end of the outer jacket 16 an additional cap 20 secured, for example, by welding. The function of this cap is to provide additional protection of the bonding layer 18 against the corrosive effects of a coolant such as water.

It will be readily seen that the teachings of the present invention afford a long bonded path between the exterior and the interior of the jacket without adding substantial amounts of non-fissionable material to effect the desired result.

The teachings of the invention shall not be deemed to be limited by the exact embodiment illustrated in the drawing.

What is claimed is:

As an article of manufacture, a right cylindrical uranium metal solid rod, a first open ended coaxial aluminum can of similar shape closely enclosing said rod over its entire curved outer surface and one of its flat end surfaces, the entire interface between said rod and said can being coherently and continuously bonded together by an alloy of aluminum and silicon, a second coaxial aluminum can of similar shape closely enclosing said first aluminum can over its entire curved outer surface and said uranium rod over the other of its flat end surfaces, the entire interface between said second can, said first can and said other flat end surface of said uranium rod being coherently and continuously bonded together by an alloy of silicon and aluminum, and an annular coaxial cap having an outside diameter equal to the outside diameter of said second aluminum can, welded to the open circular edge of said second can and to the closed outer bottom of said first can.

References Cited in the file of this patent

UNITED STATES PATENTS

| | | |
|---|---|---|
| 29,625 | Seiberling | Aug. 14, 1860 |
| 143,771 | Lumb | Oct. 21, 1873 |
| 194,564 | Sherwin | Aug. 28, 1877 |
| 1,172,035 | Newton | Feb. 15, 1916 |
| 1,545,036 | Culhane et al. | July 7, 1925 |

FOREIGN PATENTS

| | | |
|---|---|---|
| 861,390 | France | Oct. 28, 1940 |

OTHER REFERENCES

Smyth: "Atomic Energy for Military Purposes," pages 103, 104, August 1945. Copy may be purchased from Supt. of Documents, Washington 25, D.C.

Kelly et al.: "Physical Review," 73, pages 1135-9 (1948).